United States Patent
Ohishi et al.

[11] Patent Number: 6,091,171
[45] Date of Patent: Jul. 18, 2000

[54] ELECTRIC MOTOR HAVING ROTATION DETECTION SENSOR

[75] Inventors: Masanori Ohishi, Hamamatsu; Yasuo Gotou, Toyohashi, both of Japan

[73] Assignee: ASMO Co., Ltd., Kosai, Japan

[21] Appl. No.: 09/248,346

[22] Filed: Feb. 8, 1999

[30] Foreign Application Priority Data

Feb. 17, 1998 [JP] Japan .................................. 10-035158
Nov. 6, 1998 [JP] Japan .................................. 10-316354

[51] Int. Cl.$^7$ ....................................................... H02K 5/00
[52] U.S. Cl. ............................ 310/68 B; 310/71; 310/89
[58] Field of Search ................................... 310/68 B, 71, 310/89, 67 R, 68 R

[56] References Cited

U.S. PATENT DOCUMENTS

| | | | |
|---|---|---|---|
| 4,398,135 | 8/1983 | Busch et al. | 310/71 |
| 4,988,905 | 1/1991 | Tolmie | 310/68 B |
| 5,245,258 | 9/1993 | Becker et al. | 318/266 |
| 5,293,125 | 3/1994 | Griffen et al. | 310/68 B |
| 5,777,410 | 7/1998 | Asakura et al. | 310/71 |
| 5,864,188 | 1/1999 | Gerrand et al. | 310/71 |

FOREIGN PATENT DOCUMENTS

| | | | |
|---|---|---|---|
| 2707288 | 8/1978 | Germany | H02K 7/116 |
| 33352532 | 3/1985 | Germany | H02P 5/00 |

*Primary Examiner*—Nestor Ramirez
*Assistant Examiner*—B. Mullins
*Attorney, Agent, or Firm*—Rich & Richardson P.C.

[57] ABSTRACT

In a motor having a rotation detection sensor, a Hall IC device for generating an output signal indicative of rotation of a motor rotary shaft is accommodated within a casing. The casing is formed into a longitudinal shape, and is sandwiched between a motor and housing attached to the motor. The casing extends perpendicularly to the rotary shaft in the housing.

12 Claims, 8 Drawing Sheets

ELECTRIC MOTOR HAVING ROTATION DETECTION SENSOR

CROSS REFERENCE TO RELATED APPLICATION

This application relates to and incorporates herein by reference Japanese patent Applications No. 10-35158 filed on Feb. 17, 1998 and No. 10-316354 filed on Nov. 6, 1998.

BACKGROUND OF THE INVENTION

1. Field of the Invention

The present invention relates to an electric motor having a rotation detection sensor and, more particularly, to an electric motor suitable for use in a vehicle power seat apparatus.

2. Related Art

In a conventional motor, as shown in FIG. 12, a rotor 53 is disposed within a yoke 51 and a housing 52. The rotor 53 includes an armature 55, commutator 56, worm 57 and permanent magnet 58, all of which are fixedly mounted on a rotary shaft 54. The armature 55 is disposed generally centrally within the yoke 51 in the axial direction. The commutator 56 is disposed at a motor-side end position of the housing 52, where power supply brushes 59 are disposed. The worm 57 is disposed generally centrally within the housing 52 in the axial direction. The permanent magnet 58 is disposed between the worm 57 and one end of the rotary shaft 54. Both ends of the rotary shaft 54 are supported rotatably by a pair of bearings 60.

A sensor accommodation recess 52a is formed on the outer periphery of the housing 52 at a position corresponding to the permanent magnet 58. A sensor circuit plate 61 is fixedly mounted in the recess 52a, so that a Hall IC device 62 is provided on the circuit plate 61 at a position where it faces the permanent 58. The circuit plate 61 is fixed to the housing 52 by a toothed washer 3.

The recess 52a is filled with a silicone bond 7 to seal and protect the circuit plate 61 from foreign materials such as water and dust. Electric leads 65 connected to the circuit plate 61 are arranged to extend from the central part of the housing 52 to the outside of the housing 52. A protective cover 66 is fitted by a toothed washer 67 to cover the recess 52a and the electrical leads 65.

In this motor, the worm 57 and the permanent magnet 58 rotate with the rotary shaft 54 when the rotor 53 rotates, so that a worm wheel (not shown) disposed in engagement with the worm 57 is driven by the worm 57. As the direction of the magnetic field generated by the permanent magnet 58 changes with the rotation of the permanent magnet 58, the Hall IC device 62 generates an output signal indicative of rotation of the rotary shaft 54 in response to reversal in the direction of the magnetic field. This output signal is applied through the electrical leads 65 to an electronic control unit (not shown), so that the motor is feedback controlled by the control unit.

In this motor, however, the rotation detection sensor requires a number of component parts such as the accommodation recess 52a, circuit plate 61, silicone bond 64 and toothed washer 63, resulting in increase in the parts assembling work and increase in the production cost. Further, it is difficult to replace the circuit plate 61 by a new one, when the rotation detection sensor fails to operate.

As the electric leads 65 are arranged to extend along the outside of the housing 52, it requires troublesome lead arranging work. Further, as the leads 65 are likely to receive radiation noise as an antenna, the motor control by the control unit is likely to be influenced by the noise superimposed on the output signal of the Hall IC device 62. Still further, as the electric leads are exposed to the outside from the housing 52 and the protection cover 66, the electric leads 65 are cut or shorted when the motor is installed into a limited space (e.g., power seat) in a vehicle.

SUMMARY OF THE INVENTION

It is therefore an object of the present invention to provide an electric motor having a rotation detection sensor, which uses a less number of component parts and can be assembled with ease.

It is another object of the present invention to provide an electric motor having a rotation detection sensor, in which a rotation signal is less susceptible to radiation noise.

According to the present invention, a casing is formed longitudinally and sandwiched between a yoke of a motor and a housing attached to the yoke. A rotation detection sensor is accommodated in the casing. Preferably, the sensor is disposed adjacently to a commutator of the motor, and the casing is disposed to extend in the direction in which power supply brushes of the motor face each other.

BRIEF DESCRIPTION OF THE DRAWINGS

Other objects, features and advantages of the present invention will become more apparent from the following detailed description made with reference to the accompanying drawings, in which the same reference numerals designate the same or similar component parts. In the drawings.

DETAILED DESCRIPTION OF THE PREFERRED EMBODIMENT

First Embodiment

Figure 1:
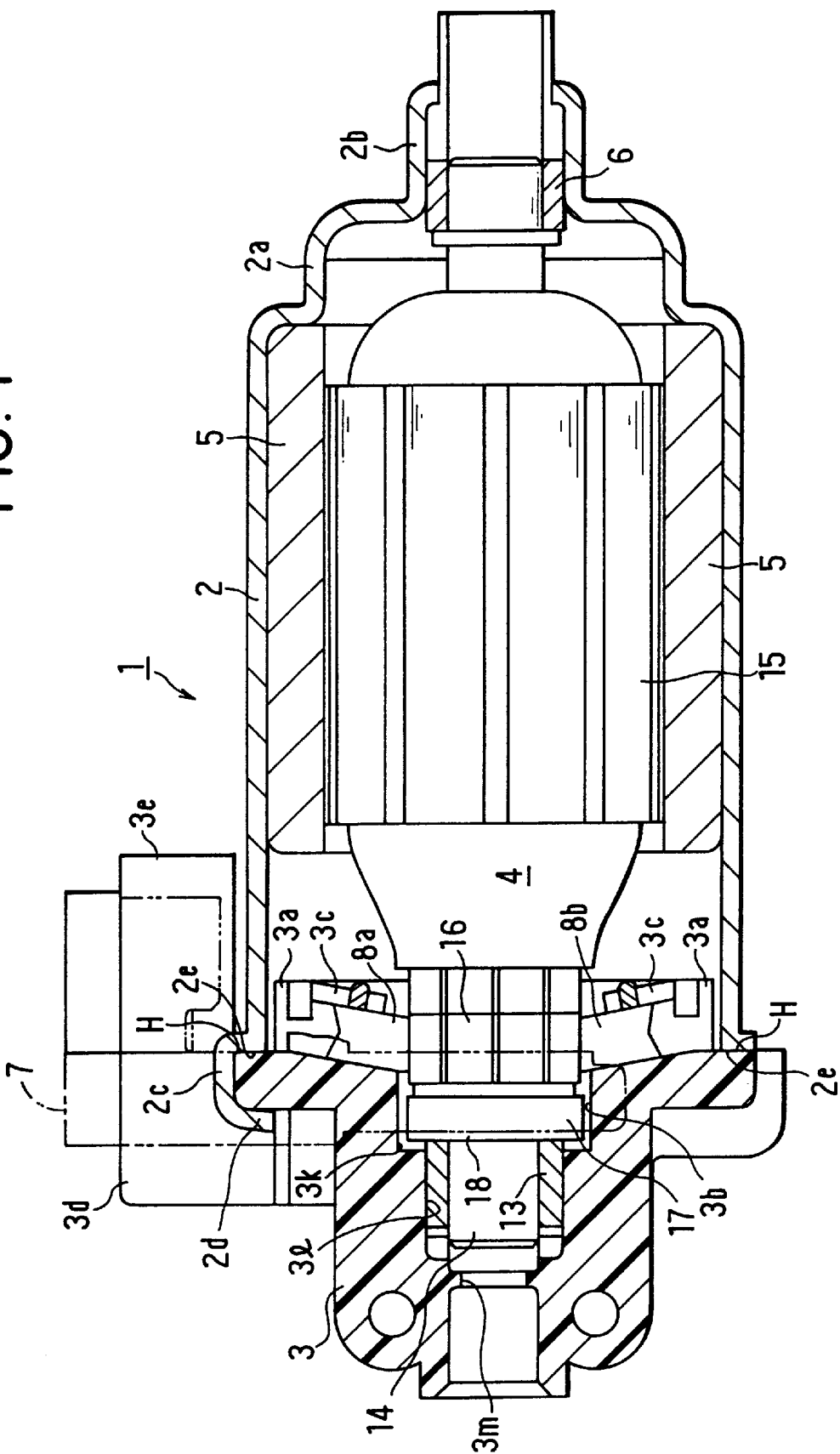
FIG. 1 is a sectional view showing an electric motor having a rotation detection sensor according to a first embodiment of the present invention.

Referring first to FIG. 1, an electric motor 1 has a yoke 2, housing 3 and rotor 4. The yoke 2 is generally formed into a cylindrical shape, which has a medium diameter cylindrical part 2a and a small diameter cylindrical part 2b at its one axial end side. A bearing 6 is disposed on the inside peripheral surface of the small diameter cylindrical part 2b. The yoke 2 is also formed with a plurality of tongues 2c, which are bent to fixedly hold the housing 3 to the other axial end side of the yoke 2. Each tongue 2c is bent to extend outwardly in the radial direction from the large diameter cylindrical part, to extend in the axial direction and to extend inwardly in the radial direction. Thus, one end 2d of the yoke 2 engages with the housing 3 to attach the housing 3 fixedly to the yoke 2 in the axial direction.

Figure 2:
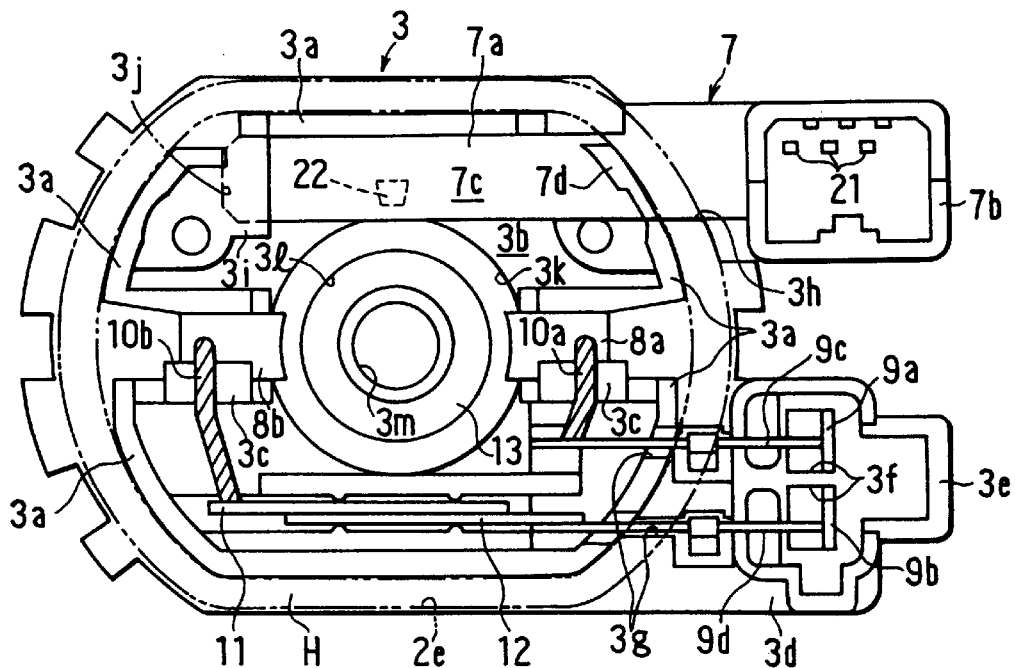
FIG. 2 is a schematic view showing a housing and a casing of the motor when viewed from a yoke side in FIG. 1.
Figure 3:
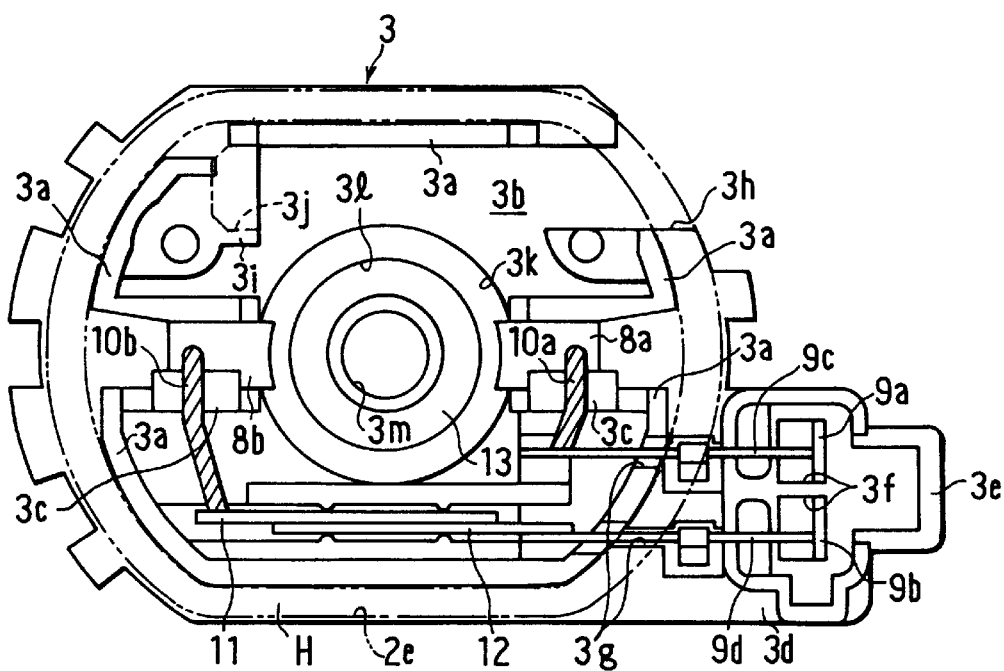
FIG. 3 is a schematic view showing the housing of the motor when viewed from the yoke side in FIG. 1.

The yoke 2 has an axial end surface 2e. As shown by two-dot chain lines in FIGS. 2 and 3, the end surface 2e comprises a pair of parallel (upper and lower) parts and a pair of side (right and left) arcuate parts connecting the parallel parts. That is, the yoke 2 is formed into a partially flattened cylindrical shape, which comprises a pair of parallel walls and a pair of arcuate walls. A pair of permanent magnets 5 are fixed to the arcuate or cylindrical inside peripheral wall of the yoke 2.

The housing 3 has an engagement wall 3a formed on a plane H, with which the axial end surface 2e of the yoke 2 abuts. The engagement wall 3a is formed to extend toward the yoke 2 in the axial direction and to extend along the inside peripheral wall of the end surface 2e in the circumferential direction, so that it abuts with the inner peripheral surface of the axial end part of the yoke 2. Thus, positioning the yoke 2 and the housing 3 is simplified, when assembling those two parts.

A sensor accommodation recess 3b is formed in the housing 3 at a position radially inside of the engagement wall 3a. A pair of brush holders 3c are formed to extend into the recess 3b, so that a pair of power supply brushes 8a, 8c are disposed in the brush holders 3c. The brush holders 3c are provided to face each other in the same radial direction as the direction in which the permanent magnets 5 face each other. Therefore, the power supply brushes 8a, 8b are also disposed in the same direction as the permanent magnets 5 face.

A power supply connector 3d is formed at a position radially outside of the plane H of the housing 3, so that it extends in the direction parallel to the direction in which the brushes 8a, 8b face. The connector 3d has a terminal connection part 3e extending in the axial or longitudinal direction of the yoke 2. A pair of terminal recesses 3f and the accommodation recess 3b are held in communication with each other through communication recesses 3g. A pair of conductive plates 9c, 9d, which are formed by bending a pair of conductive power supply pins 9a, 9b disposed in the terminal recesses 3f, are fixed in the communication recesses 3g. The brush 8a and the conductive plate 9c are connected through a copper lead 10a, while the brush 8b and the conductive plate 9d are connected through a copper lead 10b and conductive plates 11, 12.

A cut-out 3h, which is cut out in the direction in which the brushes 8a, 8b face, is formed at a side of the accommodation recess 3b. The cut-out 3h, has a cut-out part formed on the side surface which is on the same side as the connector 3d. On the same plane as the abutment plane H, a casing end holding part 3i is formed to extend to the inside of the engagement wall 3a. A fitting recess 3j is formed on the casing end holding part 3i to extend from the side of cut-out 3h.

A large diameter recess 3k is formed at the central part of the accommodation recess 3b, and a small diameter recess 3l is formed at the central part of the large diameter recess 3k. An annular bearing 13 is fitted on the inside peripheral surface of the small diameter recess 3l. A through hole 3m is formed at the central part of the small diameter recess 3l.

A rotary shaft 14 of the rotor 4 is supported by the bearings 6, 13 rotatably relative to the yoke 2 and the housing 3. The rotor 4 has an armature 15, commutator 16 and a permanent magnet 17 on its rotary shaft 14. The armature 15 is disposed to face the permanent magnets 5 in the radial direction. The commutator 16 is disposed in sliding contact with the brushes 8a, 8b. The permanent magnet 17 is disposed adjacently to the commutator 16 in the axial direction at a position where the accommodation recess 3b is formed. The permanent magnet 17 is fixed to the rotary shaft 14 by a press-fitting washer 18.

Figure 4A:
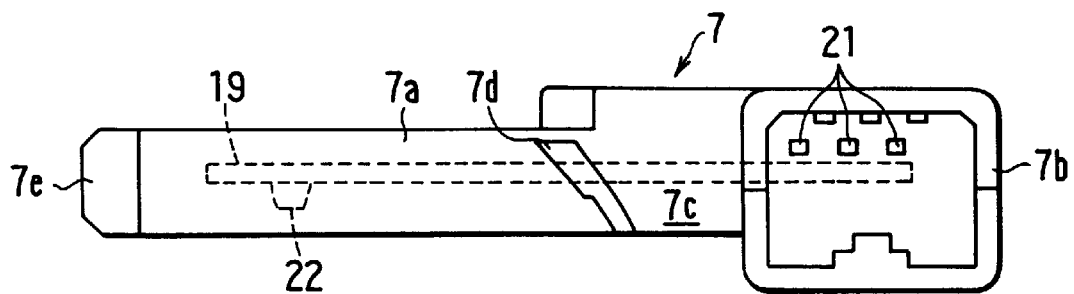
FIGS. 4A to 4C are schematic views showing the casing of the motor shown in FIG. 2.
Figure 4B:
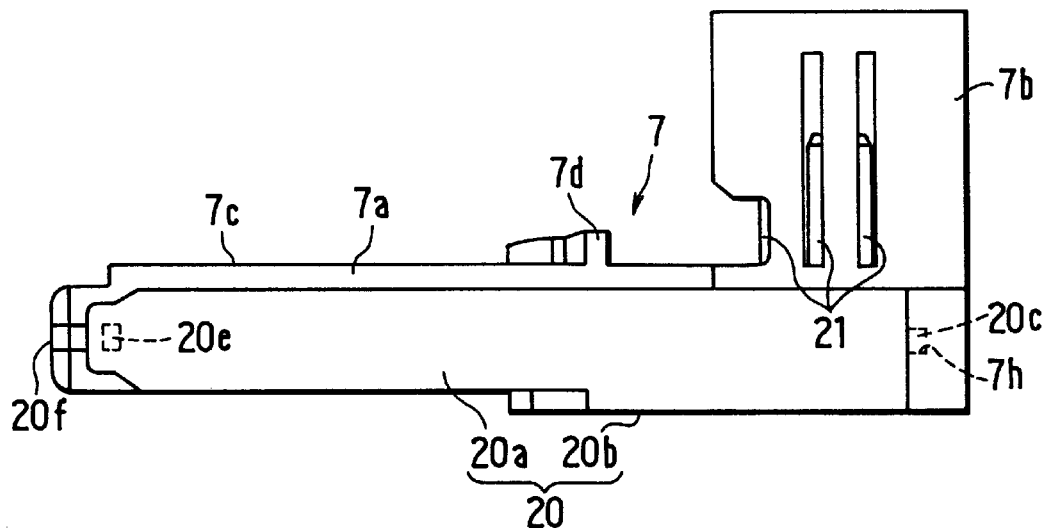
Figure 4C:
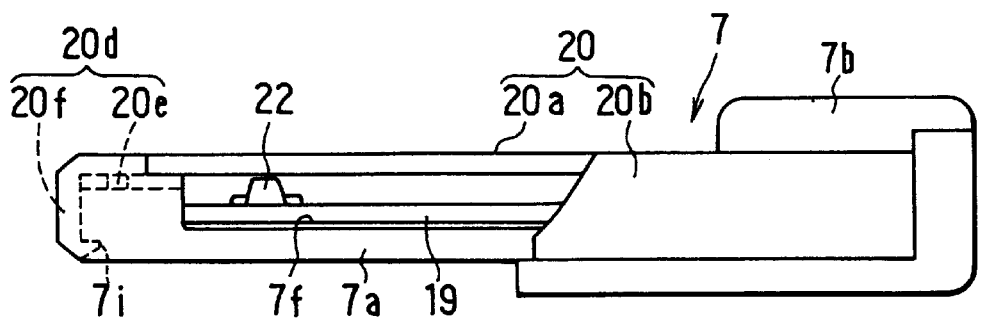

A casing 7 is made of resin. It has, as shown in FIGS. 4A to 4C, a circuit plate accommodation part 7a partly accommodated within the accommodation recess 3b and a connection part 7b extending perpendicularly from one end of the circuit plate accommodation part 7a in an L-shape as shown in FIG. 4B.

As shown in FIG. 1, the circuit plate accommodation part 7a is accommodated within the accommodation recess 3b, so that its longitudinal part extends in a direction parallel with the direction in which the brushes 8a, 8b face each other. The circuit plate accommodation part 7a has a plane 7c, on which the connection part 7b is provided. The plane 7c is on the same plane as the abutment plane H of the housing 3. An engagement wall 7d is formed to protrude from the plane 7c as a protrusion latch. This engagement wall 7d is formed to extend along the inside periphery of a cut-out 2e of the yoke 2 as the engagement wall 3a of the housing 3. Thus, the engagement wall engages with the inside peripheral wall of the arcuate wall of the yoke 2 to latch the casing 7 to the housing 3.

A fitting protrusion 7e is formed on the circuit plate accommodation part 7a at an end opposite to the connection part 7b. The fitting protrusion 7e extends from the surface 7c through a step in the longitudinal direction of the accommodation part 7a, so that it fits in the fitting recess 3j of the casing end holding part 3i. The yoke 2 and the housing 3 are assembled with the fitting protrusion 7e of the casing being fitted in the fitting recess 3j of the housing 3. In addition, the central part of the circuit plate accommodation part 7a is sandwiched by the yoke 2 and the housing 3 at the cut-out 3h. The engagement wall 7d of the circuit plate accommodation part 7a engages with the inside peripheral surface of the end of the yoke 2. Thus, the yoke 2 and the housing 3 are held tightly between the yoke 2 and the housing 3.

Figure 5:
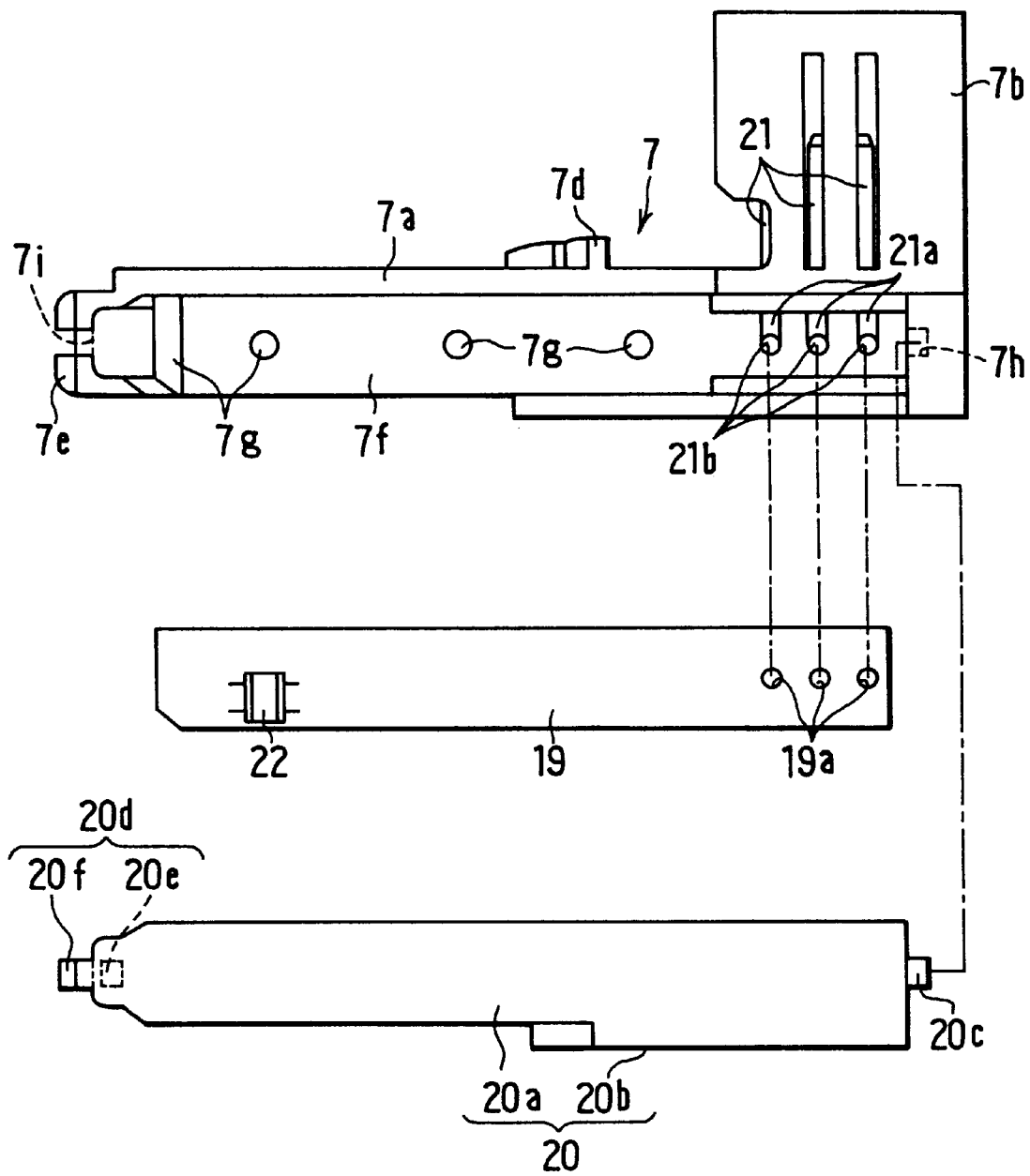
FIG. 5 is an exploded view showing the casing of the motor shown in FIG. 2.

The casing 7 has a circuit plate 19 in the circuit plate accommodation part 7a, and a protective cover 20. As shown in FIGS. 4C and 5, a recess 7f is formed in the accommodation part 7a. A plurality of circuit plate support parts 7g are provided on the bottom surface of the recess 7f to support the circuit plate 19 thereon. Connector pins 21 are disposed in the connection part 7b with ends 21a thereof extending from the side surface of the recess 7f. The ends 21a of the connector pins 21 have free ends 21b, which are bent in the upper direction of the recess 7f. Terminal holes 19a are formed in the circuit plate 19 at positions where the free ends 21b of the connector pins 21 are disposed. Thus, with the free ends 21b of the connector pins 21 being inserted into the terminal holes 19a and the circuit plate 19 being placed on the support parts 7g, the free ends 21b are soldered to the circuit plate 19.

The recess 7f is open at a side opposite to the side where the connection part 7b is formed. A fitting recess 7h is formed on the inside surface of the recess 7f at a longitudinal end position where the connection part 7b is provided. As shown in FIG. 4C, a nail recess 7i, which opens to the longitudinal end of the circuit plate accommodation part 7a, is formed at the side opposite to the fitting protrusion 7e. The protective cover 20 is made of resin. The protective cover 20 has a magnet-faced protective part 20a for covering the upper side of the recess 7f, and a shape protective part 20b for covering partly the lateral sides of the recess 7f. A fitting protrusion 20c is formed at one longitudinal end side of the magnet-faced protective part 20a, and a male engagement part 20d is formed at the other longitudinal end side. As shown in FIG. 4C, the male engagement part 20d has a protrusion 20e for protecting a Hall IC device 22 from being pressed down, and a nail 20f extending to be fitted into the nail recess 7i. The protective cover 20 is fixed to the accommodation part 7a of the casing 7 with its fitting protrusion 20c being fitted in the fitting recess 7h and with its nail 20f being hooked in the nail recess 7i.

The Hall IC device 22 is mounted on the circuit plate 22 to detect rotation of the rotary shaft 14. The Hall IC device 22 includes a Hall effect element and an associated electronic circuit for generating an output signal in response to changes in the magnetic field. The Hall IC device 22 faces the permanent magnet 17 through the protective cover 20 with a spacing relative to the permanent magnet 17, when the casing 7 is assembled to the housing 3. Although not shown in the figures, a conductive circuit pattern are printed on the surface of the circuit plate 19 where the Hall IC element is mounted. The circuit pattern is coated with an insulating resin.

This motor 1 may be placed within a vehicle seat to move a seat base in a forward/backward direction or in a upward/downward direction, or to move a seat back. When electric power is supplied through the power supply connector 3d to the motor 1, the permanent magnet 17 rotates with the rotary shaft 14. A connecting shaft (not shown) coupled with the rotary shaft 14 through the through hole 14 also rotates to drive the power seat.

As the direction of the magnetic field generated by the permanent magnet 17 changes alternately at the position where the Hall IC device 22 is disposed, the Hall IC device 22 responsively generates an output signal at a frequency proportional to the rotation speed of the rotor 4. This signal is applied to a control unit (not shown) through connector pins 21 of the connection part 7b, so that the control unit feedback controls the motor in response to the output signal.

As the recess 7f of the casing 7 is substantially sealed when the casing 7 is assembled with the housing 3. Therefore, brush powders produced during sliding of the brushes 8a, 8b on the commutator 16 is restricted from entering into the recess 7f. Further, as the surface of the Hall IC device 22 and the circuit plate 19 is coated with the insulating resin, the Hall IC device 22 and the circuit plate 19 doe not operate improperly even when the brush powders enters into the recess 7f.

(1) According to this embodiment, as the circuit plate 19 with the Hall IC device 22 is accommodated within the casing 7, which is sandwiched between the yoke 2 and the housing 3 with its Hall IC device 22 being placed in opposition to the permanent magnet 17. As a result, the number of component parts for disposing the Hall IC device 22 at the predetermined position can be reduced. Thus, assembling the component parts is simplified and the production cost of the motor 1 is reduced.

(2) The housing 3 has the accommodation recess 3b in which the fitting recess 3j is provided. The casing 7 has the fitting protrusion 7e which fits into the fitting recess 3j. As a result, positioning the casing 7 relative to the housing 3 can be simplified when the casing 7 is assembled with the housing 3.

(3) The casing 7 has the fitting protrusion 7e and the engagement wall 7d. By only assembling the yoke 2 with the housing 3 with the fitting protrusion 7e of the casing 7 with the fitting recess 3j of the housing 3, the casing 7 is engaged with the yoke 2 and housing 3 to be sandwiched and held in tight between the two. That is, as the central part of the circuit plate accommodation part 7a is sandwiched between the yoke 2 and the housing 3 and the engagement wall 7d engages with the inside peripheral wall of the end of the yoke 2, the casing 7 is held tightly at the predetermined position between the yoke 2 and the housing 3. Thus, positioning the Hall IC device 22 accommodated within the casing 7 at the predetermined position can be simplified. Further, as the casing 7 can be removed from the yoke 2 and the housing 3 by only disengaging the yoke 2 and the housing 3, the Hall IC device 22 can be replaced without difficulty when it fails to operate properly. The casing 7 is restricted from being disengaged from the yoke 2 and the housing 3, because the engagement wall 7d is engaged with the inside peripheral surface of the end of the yoke 2.

(4) The casing 7 has the connection part 7b which passes the output signal of the Hall IC device 22. The connector pins 21 of the connection part 7b are directly connected to the circuit plate 19. As a result, separate electric leads are not necessitated to connect the Hall IC device 22 with the connector pins 21. This also results in a reduction in the number of component parts. As electric leads need not be arranged, the production is simplified. As the electric leads are not exposed to the outside of the motor 1, the output signal generated from the Hall IC device 22 can be protected from the noise. Further, even when the motor 1 is installed within the limited space in the power seat, the leads do not disconnect or short.

(5) The brushes 8a, 8b disposed to face each other in the same direction as the magnets 5 face each other. As a result, the parallel flat walls of the yoke 2 need not be expanded in the radial direction. Thus, the motor 1 can maintain the flattened cylindrical shape, thus enabling an installation of the motor 1 within the limited space in the power seat.

Second Embodiment

Figure 6:
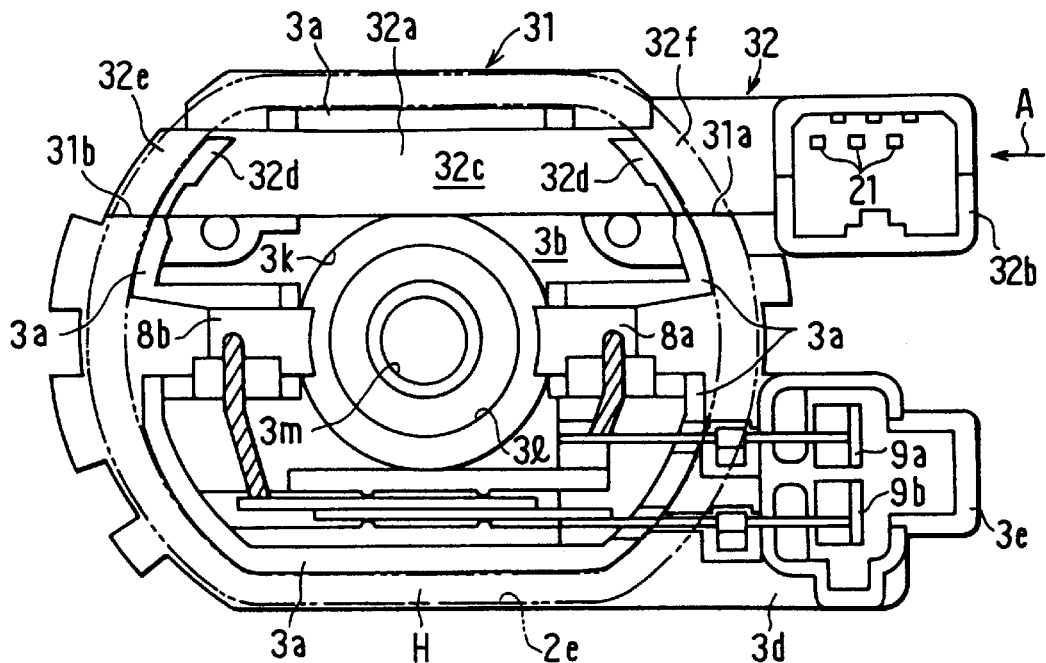
FIG. 6 is a schematic view showing a housing and a casing of an electric motor according to a second embodiment of the present invention.
Figure 7:
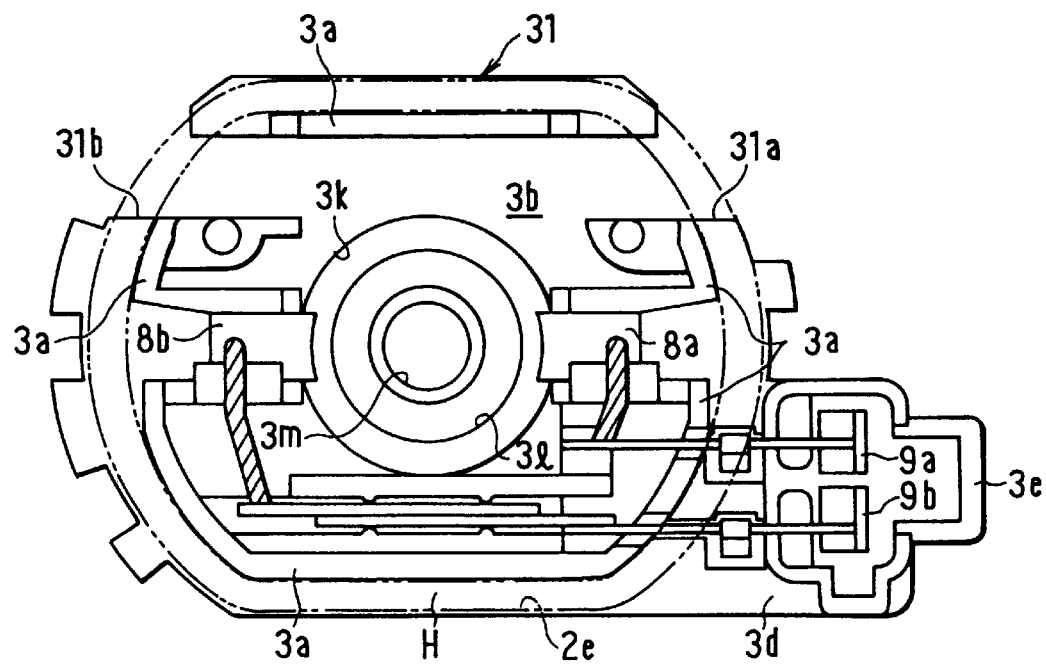
FIG. 7 is a schematic view showing the housing of the motor shown in FIG. 6.
Figure 8A:
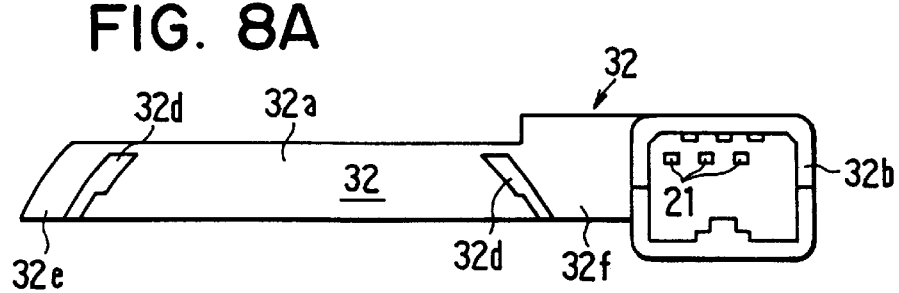
FIGS. 8A and 8B are schematic views showing the casing of the motor shown in FIG. 6.
Figure 8B:
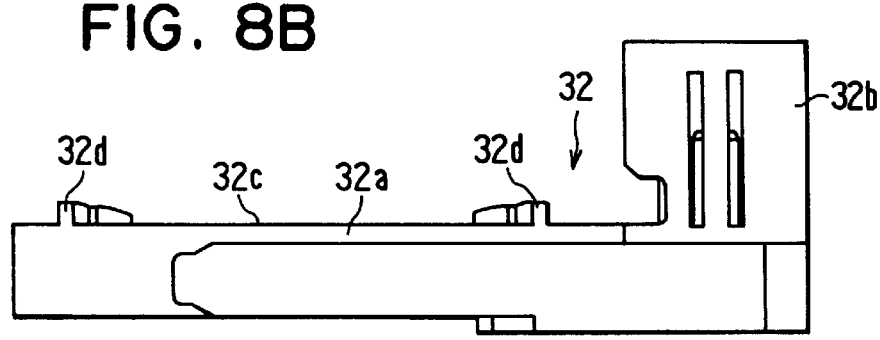

In the above embodiment, the shapes of the yoke 2, housing 3 and casing 7 may be changed, as long as the casing 7 is engaged with and held fixedly to at least one of the yoke 2 and housing 3. For instance, as shown in FIGS. 6 to 8, the housing 3 and the casing 7 may be changed to a housing 31 and casing 32.

On the arcuate side surfaces of the accommodation recess 3b of the housing 31, a pair of cut-outs 31a, 31b are formed to align with the top and bottom flat surface of the housing 31. The casing 32 has a circuit plate accommodation part 32a, which is partly accommodated within the accommodation recess 3b, and a connection part 32b, which extends from the end of the accommodation part 32a in an L-shape.

In the accommodation part 32a, a surface 32a, on which the connection part 32b is formed, is so shaped to be on the same plane as the abutment plane H of the housing 31 when the accommodation part 32 is assembled to the housing 31. A pair of engagement walls 32d are formed to protrude from the surface 32c. The walls 32d are formed arcuately to engage with the inside peripheral surface of the end of the yoke 2 when the end of the yoke 2 abuts.

The yoke 2 and the housing 31 are assembled to each other while accommodating the accommodation part 32a within the accommodation recess 3b, so that the engagement wall 32d of the casing 32 is placed at the predetermined position. The end 32e and the intermediate part 32f of the casing 32 are sandwiched between the yoke 2 and the housing 31, and the engagement walls 32d engages with the inside peripheral surfaces of the end of the yoke 2. Thus, the casing 32 is held tightly in position between the yoke 2 and the housing 31.

According to this embodiment, in addition to the advantages of the first embodiment, freedom of assembling the casing 32 with the housing 31 is enhanced. That is, the casing 32 can be assembled with the housing 31 by inserting the end 32e of the accommodation part 32a through the cut-out 31a first (i.e., in the direction A in FIG. 6.). The casing 32 can be assembled with the housing 31 by inserting the circuit plate accommodation part 32a from the upper side of the accommodation recess 3b of the housing 31 (i.e., in the direction perpendicular to the drawing sheet of FIG. 6).

Third Embodiment

Figure 9:
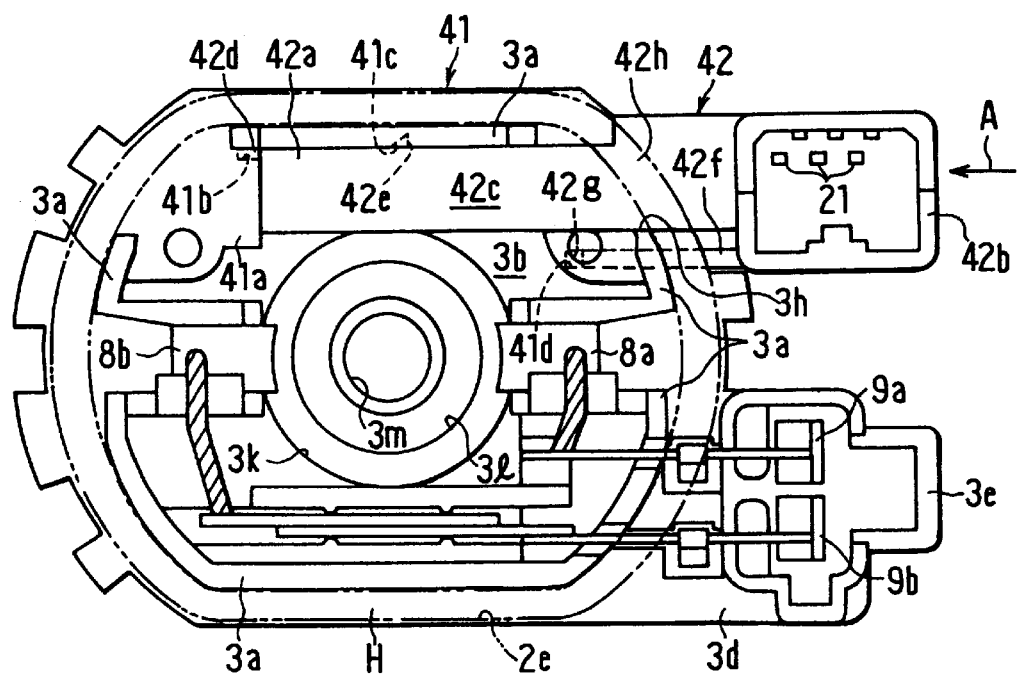
FIG. 9 is a schematic view showing a housing and a casing of an electric motor according to a third embodiment of the present invention.
Figure 10:
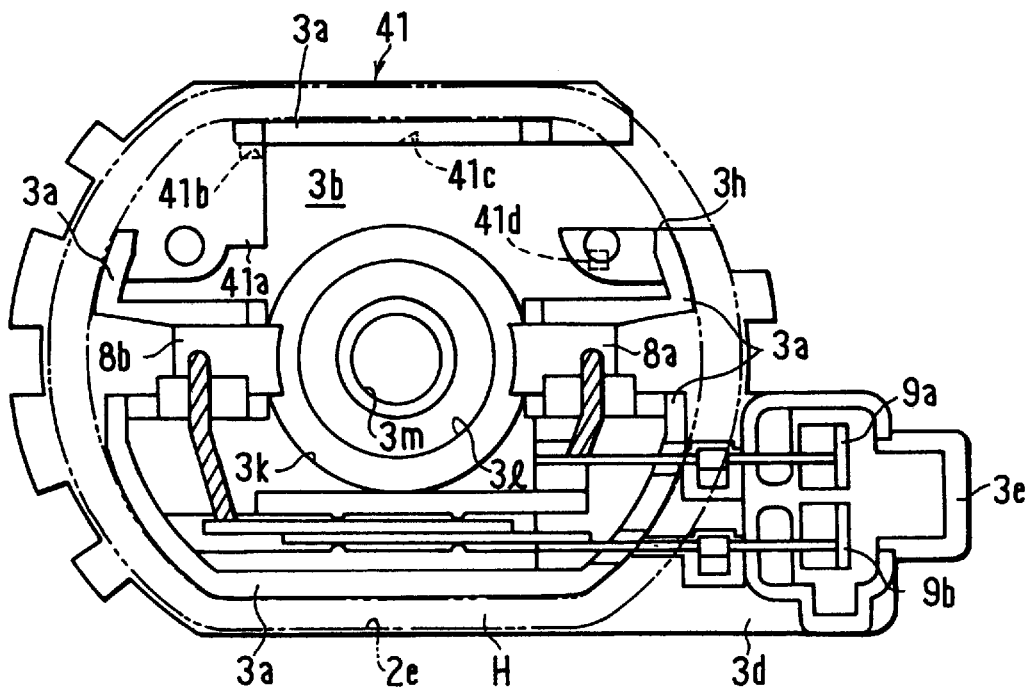
FIG. 10 is a schematic view showing the housing of the motor shown in FIG. 9.

In this embodiment, a housing 41 and a casing 42 are shaped as shown in FIGS. 9 to 11. The housing 41 has a casing top holding part 41a, which is formed to extend to the inside of the engagement wall 3a on the same plane of the abutment plane H of the housing 41. A fitting recess 41b is formed from the side of the cut-out 3h. In the housing 41, an engagement recess 41c is formed on a part of the side surface of the accommodation recess 3b as shown by a dotted line in FIGS. 9 and 10. Further, an engagement recess 41d is formed on the outer side surface of the housing 41 as shown by a dotted line in FIGS. 9 and 10.

The casing 42 has a circuit plate accommodation part 42a, which is partly accommodated within the accommodation recess 3b, and a connection part 42b protruding in an L-shape from the end of the accommodation part 42a. The accommodation part 42a has a surface 42c, on which the connection part 42b is formed. The surface 42c is on the same plane as the abutment plane H of the housing 41 when the accommodation part 42a is assembled with the housing 41.

A fitting protrusion 42d is formed at the end of the accommodation part 42a, which is opposite from the connection part 42b in the longitudinal direction. The fitting protrusion 42d is shaped to fit in a fitting recess 41b of the casing top end holding part 41a, so that the protrusion 42d does not displace in the direction perpendicular to the longitudinal direction of the casing 42 (i.e., in the axial direction if the armature 15).

Figure 11A:
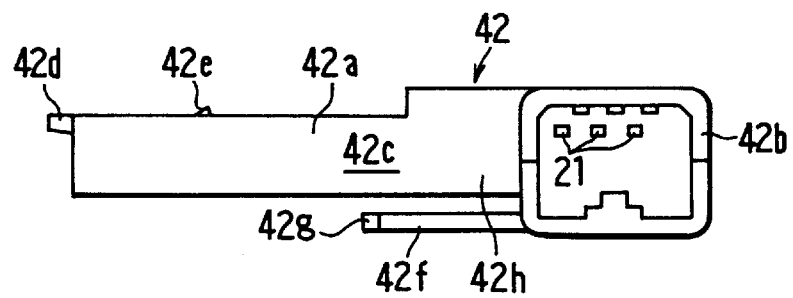
FIGS. 11A and 11B are schematic views showing the casing of the motor shown in FIG. 9.

An engagement protrusion 42e is formed on one side surface of the accommodation part 42a. The protrusion 42e is formed in a triangular shape as shown in FIG. 11A when viewed from the surface 42c, on which the connection part 42b is formed. The edge of the protrusion is shaped to be easily engaged in the direction in which the connection part 42b is formed. Although this edge is shaped to be easily engaged with the fitting recess 41b, it has an obtuse angle.

Figure 11B:
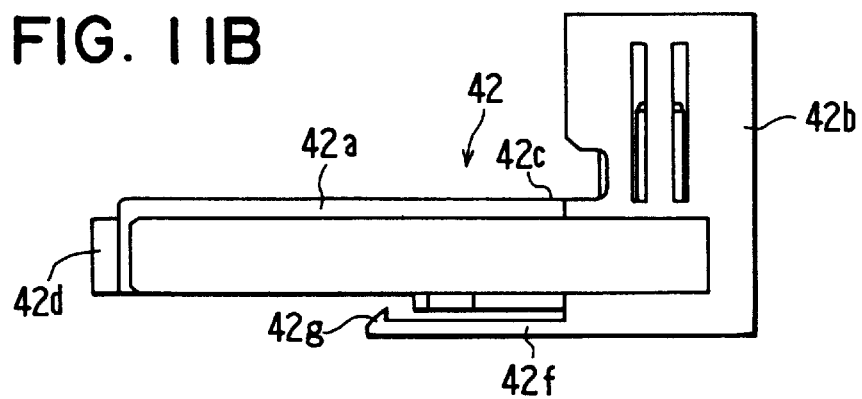
Figure 12:
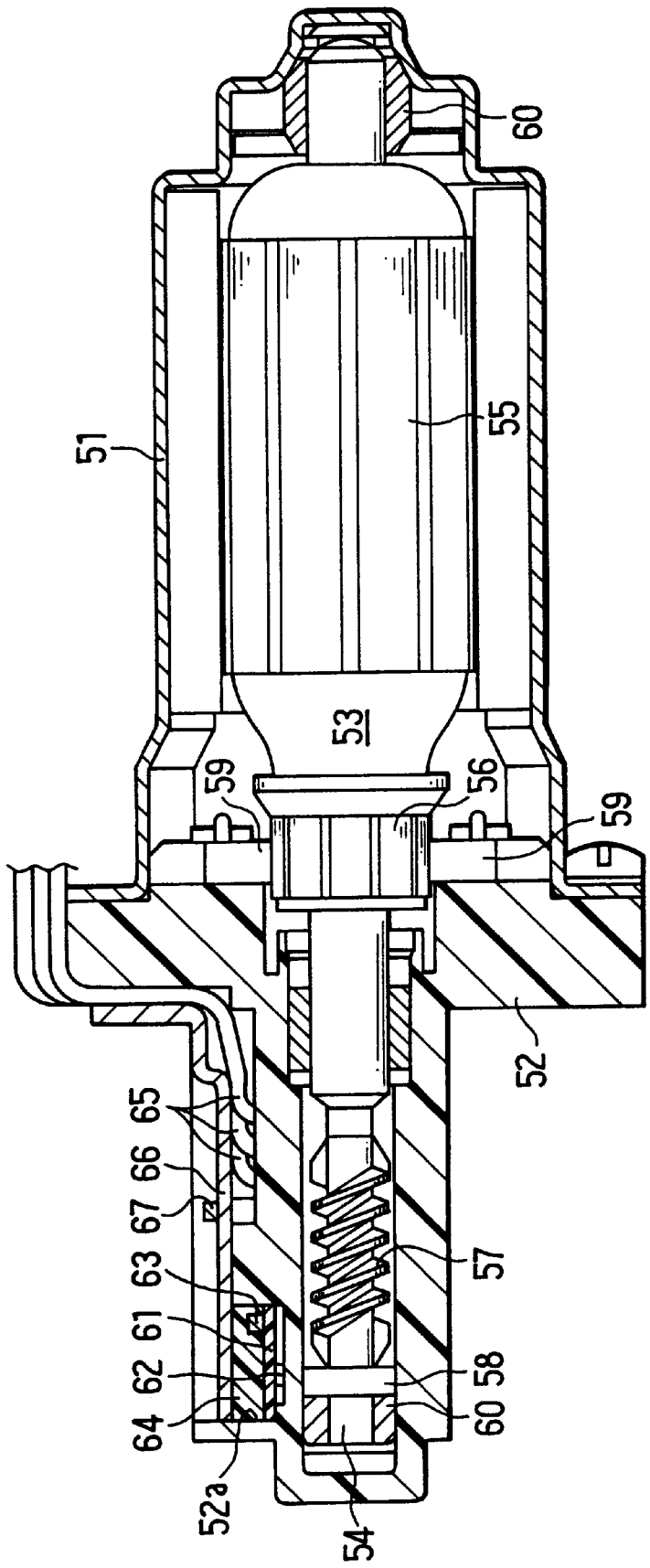
FIG. 12 is a sectional view showing a conventional electric motor having a rotation detection sensor.

In the circuit plate accommodation part 42a, an engagement part 42f is formed on the side surface opposite to the surface 42c, on which the connection part 42b is formed, as shown in FIG. 11B. This engagement part 42f is formed to extend along the accommodation part 42a. A nail 42g is formed to engage with an engagement recess 41d formed on the outside of the housing 41.

The fitting protrusion 42d of the casing 42 is inserted through the cut-out 3h (in the direction A in FIG. 9) so that the accommodation part 42a is accommodated within the accommodation recess 3b of the housing 41. In this instance, the fitting protrusion 42d fits in the fitting recess 41b of the holding part 41a. the engagement protrusion 42e engages with the engagement recess 41c. Further, the nail 42g of the engagement part 42f engages with the engagement recess 41d. Thus, the casing 42 can be held fixedly to the housing 41. When the housing 41 is assembled to the yoke 2, the intermediate part 42h of the accommodation part 42c is sandwiched between the housing 41 and the yoke 2. As a result, the casing 42 is held tightly between the housing 41 and the yoke 2.

In addition to the advantages of the first embodiment, the casing 42 can be assembled to the housing 41 with more assembling freedom. That is, the casing 42 can be assembled to the housing 41 either before or after the housing 41 and the yoke 2 are assembled.

Further, the casing 42 can be disengaged form the housing 41 even under the condition that the housing 41 and the yoke 2 are held assembled. That is, because the edge of the protrusion 42e has the obtuse angle, the accommodation part 42a of the casing 42 can be pulled out of the accommodation recess 3b of the housing 41 by disengaging the nail 42g and pulling the casing 42 from the housing 41. Thus, the Hall IC device 22 in the casing 42 can be replaced by a new one.

In the foregoing embodiments, the casing 7 need not have the connection part 7b. In this instance, electrical leads may be used to connect the circuit plate 17 and an external connector.

The present invention should not be limited to the disclosed embodiments and modifications, but may be implemented in many other ways without departing from the spirit of the invention.

What is claimed is:

1. An electric motor comprising:

a rotor having a rotary shaft;

a yoke supporting one end of the rotary shaft rotatably and formed into a flat shape having a pair of parallel flat walls;

a housing supporting another end of the rotary shaft rotatably and supporting the rotor therein with the yoke;

position indicating means, mounted on the rotor, for indicating a position of rotation of the rotor;

signal generating means, disposed to face the position indicating means with a spacing relative to the position indicating means, for producing an output signal varying with the rotation of the rotor;

a commutator disposed on the rotary shaft;

a pair of power supply brushes disposed to face each other through the commutator; and a casing accommodating the signal generating means therein and sandwiched between the housing and the yoke, the casing being disposed between the pair of power supply brushes and one of the parallel flat walls in such a manner that a longitudinal direction of the casing is in parallel with the one of the parallel flat walls and a direction in which the pair of power supply brushes face each other.

2. An electric motor of claim 1, wherein:

the casing has a connection means for transmitting therethrough the output signal of the signal generating means to an outside of the casing.

3. An electric motor of claim 1, wherein:

the commutator is disposed adjacent to the signal generating means in an axial direction of the rotor;

the pair of power supply brushes are disposed in one of the housing and the yoke to face each other in a radial direction of the rotor, and the casing has a part extending longitudinally in a direction parallel with the direction in which the power supply brushes face each other.

4. An electric motor of claim 3, wherein:

the rotor has an armature;

the yoke has a pair of arcuate walls connecting the parallel flat walls into a generally cylindrical shape; and a pair of magnets are fixed to inside peripheral surfaces of the arcuate walls so that the magnets face each other through the armature in the same radial direction as the power supply brushes face each other.

5. An electric motor of claim 1, wherein:

one of the housing and the yoke has an accommodation part therein which is open at an axial end thereof for engagement with the other of the housing and the yoke; and the casing is accommodated in the accommodation part.

6. An electric motor of claim 5, wherein:

the accomodation part has a shape which enables insertion of the casing in a plurality of radial directions.

7. An electric motor of claim 1, wherein:

the casing has an engagement protrusion engageable with the yoke and the housing, thereby restricting disengagement of the casing from the housing and the yoke.

8. An electric motor of claim 1, wherein:

the casing has a longitudinal part accomodating the signal generating means therein; and the longitudinal part is located adjacently to the rotary shaft and radially outside of the rotary shaft.

9. An electric motor comprising:

a rotor having a rotary shaft;

a yoke supporting one end of the rotary shaft rotatably;

a housing supporting another end of the rotary shaft rotatably and supporting the rotor therein with the yoke;

position indicating means, mounted on the rotor, for indicating a position of rotation of the rotor;

signal generating means, disposed to face the position indicating means with a spacing relative to the position indicating means, for producing an output signal varying with the rotation of the rotor;

a casing accommodating the signal generating means therein and sandwiched between the housing and the yoke; and the casing has an engagement protrusion engageable with the yoke and the housing thereby restricting disengagement of the casing from the housing and the yoke; wherein the engagement protrusion has an arcuate shape in correspondence with a cylindrical wall part of the yoke.

10. An electric motor comprising:

a rotor having a rotary shaft;

a yoke supporting one end of the rotary shaft rotatably;

a housing supporting another end of the rotary shaft rotatably and supporting the rotor therein with the yoke;

position indicating means, mounted on the rotor, for indicating a position of rotation of the rotor;

signal generating means, disposed to face the position indicating means with a spacing relative to the position indicating means, for producing an output signal varying with the rotation of the rotor;

a casing accommodating the signal generating means therein and sandwiched between the housing and the yoke, wherein the casing has a central part extending longitudinally and accommodating the signal generating means therein, a connection part provided at one end of the central part for transmitting the output signal to an outside of the casing, and an engagement part provided at another end of the central part; and the housing has a cut-out through which the casing is inserted in a radial direction of the rotor, and an engagement recess which receives the engagement part of the casing therein.

11. An electric motor comprising;

a rotor having a rotary shaft, armature and a commutator;

a yoke supporting one end of the rotary shaft rotatably;

a housing disposed axially adjacently to the yoke and supporting another end of the rotary shaft rotatably;

a sensor for producing an output signal varying with the rotation of the rotor;

a pair of power supply brushes disposed in one of the housing and the yoke to face each other through the commutator; and a casing having a longitudinal shape and accommodating the sensor therein, the casing extending in a direction transverse to the rotary shaft at a position radially outside of the rotary shaft, the casing being disposed in a space formed adjacent to the pair of power supply brushes in the one of the housing and the yoke, in such a manner that a longitudinal direction of the casing is in parallel with a direction in which the pair of power supply brushes face each other.

12. An electric motor of claim 1, wherein:

the yoke has a pair of parallel flat walls and a pair of arcuate walls connecting the flat walls in a generally cylindrically shape;

the housing has a cut-out on a peripheral wall thereof so that the casing is inserted into the housing therethrough in parallel with the flat walls; and the casing has a connection part at one end thereof so that the output signal is transmitted therethrough to an outside of the casing, the connection part being positioned outside of the housing.

* * * * *